Sept. 16, 1947.   P. P. NEWCOMB   2,427,505
VIBRATION DAMPER
Filed Aug. 30, 1944

INVENTOR.
Philip Putney Newcomb
BY
John C. Kerr
ATTORNEY

Patented Sept. 16, 1947

2,427,505

UNITED STATES PATENT OFFICE 2,427,505

VIBRATION DAMPER

Philip Putney Newcomb, Manchester, Conn., assignor to United Aircraft Corporation, East Hartford, Conn., a corporation of Delaware Application August 30, 1944, Serial No. 551,994

9 Claims. (Cl. 64—27)

This invention relates to power transmitting devices for internal combustion engines, particularly aircraft engines, and has for its object to provide a novel and improved device of this type in which the transmission of torsional vibrations from a rotary driving member to a driven member is reduced to a minimum.

Another object of the invention is to provide a power transmitting device including a fluid filter for absorbing and dampening torsional vibrations.

Another object is to provide a simple and efficient device of the above type whereby torsional vibrations of a rotary driving member, such as an engine crankshaft, are dampened and thereby largely isolated from a driven member such as the engine supercharger.

Still another object is to provide a fluid vibration dampening mechanism embodying the foregoing features, which is simple in construction, extremely durable and reliable in operation, and is particularly characterized by its lightness and compactness and its general adaptability for use in airplane power plants.

Various other objects and advantages will be apparent as the nature of the invention is more fully disclosed.

For purposes of illustration I shall describe the invention in its application to a torsional vibration dampener interposed between the crankshaft of an internal combustion engine and a gear train which drives the supercharger of said engine, although it will be evident as the description progresses that the device may be used to equal advantage in many other situations.

The dampening device includes a pair of driving members or dashpot pistons which are loosely keyed or splined on a rotary shaft driven by the engine and subject to the reaction torque thereof, and are coupled by means of helical splines to the gear mechanism which drives the supercharges. The pistons are urged apart by springs and contain a fluid such as oil on both sides thereof.

Torsional vibrations in the rotary driving shaft cause the pistons to be moved toward or away from each other, depending upon the direction of the vibration, due to the thrust imposed by the helical splines on said pistons. These vibrations are absorbed by the pumping action of the pistons which act to force the dampening fluid in and out of orifices which are formed in the sides of the pistons as well as through the spline teeth, thus isolating the vibrations from the supercharger drive.

Although the novel features which are characteristic of this invention are set forth more in detail in the claims appended hereto, the nature and scope of the invention may be better understood by referring to the following description, taken in connection with the acocmpanying drawing forming a part thereof, in which a specific embodiment has been set forth for purposes of illustration.

In the following description certain specific terms are used for convenience in referring to the various details of the invention. These terms, however, are to be interpreted as broadly as the state of the air will permit.

Figure 1:
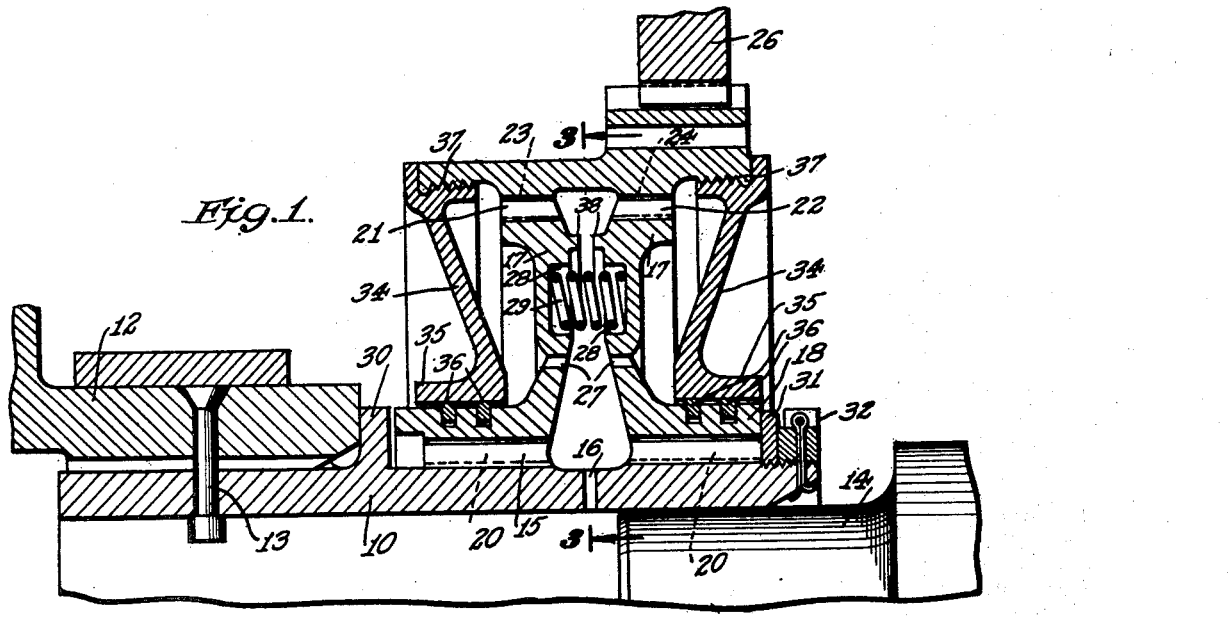
Fig. 1 is a longitudinal sectional view through the upper half of a torsional vibration dampener embodying the invention.

The torsional vibration dampener shown in the drawing includes a cylindrical member 10 mounted on the rear of an engine crankshaft 12 in splines, and retained by pins 13, and bearing on the extension shaft 14, as illustrated in Fig. 1.

Figures 2, 3:
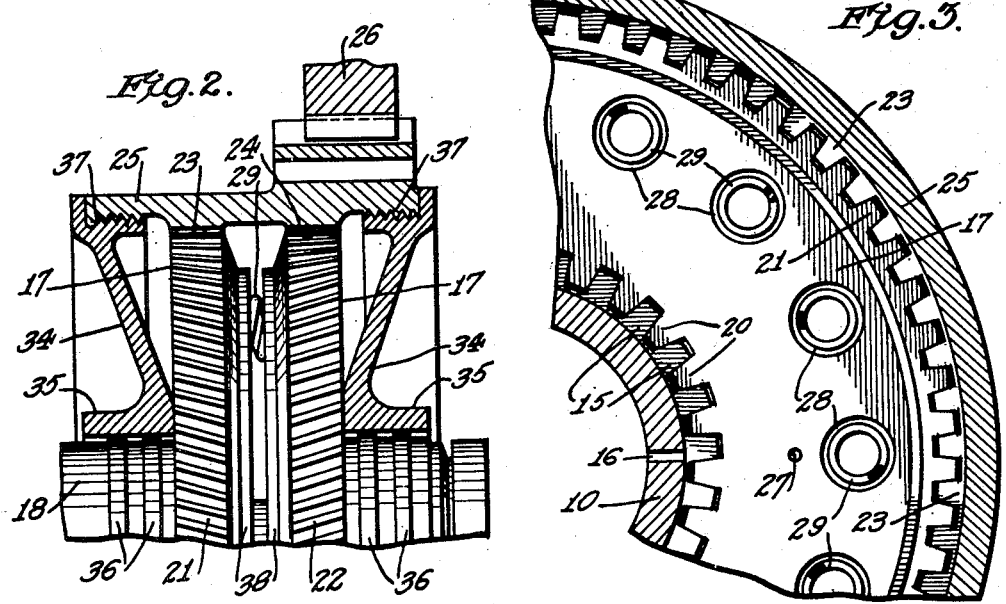
Fig. 2 is a plan view, partly in section, illustrating the helically splined driving members and associated elements.
Fig. 3 is a fragmentary vertical section, on an enlarged scale, taken on line 3—3 of Fig. 1.

A set of splines 15 are machined on the outer cylindrical surface of member 10, and an oil supply hole 16 is drilled through said member, as shown in Figs. 1 and 3.

A pair of driving members or dashpot pistons 17 are mounted on the cylindrical member 10. These piston members have sylindrical flanges 18 provided with splines 20 which loosely engage the splines 15 of member 10. The outer peripheral surfaces of the piston members 17 are machined to provide left-hand and right-hand helical splines 21 and 22, respectively, which intermesh with similar splines 23 and 24 on a supercharger driving gear 25. This gear 25, in turn, drives a supercharger (not shown) through a suitable gear train 26.

The adjacent inner faces of the piston members 17 are provided with a plurality of dampener orifices 27 for a purpose hereinafter described. They are also provided with circular series of aligned recesses 28 containing coil springs 29 which serve to force said members 17 apart. Separating movement of the members 17 longitudinally of cylindrical member 10 is limited by a shoulder 30 on member 10, and by a washer 31 and spanner nut 32, as shown in Fig. 1.

The piston members 17 are enclosed by a housing including end plates 34 having cylindrical hubs or flanges 35 which are mounted on the flanges 18 of the respective piston members 17 and are sealed thereon by suitable sealing rings 36, as shown in Figs. 1 and 2. The outer peripheral edges of end plates 34 are secured as by screw threads 37 to the inner annulus of the supercharger driving gear 25.

Oil under pressure is admitted to the space between the members 17 through the supply hole 16. This oil likewise flows through the orifices 27 into the area between driving members 17 and end plates 34.

As the engine is operated, the members 17 will move to and fro parallel to the crankshaft, due to the thrust imposed by the helical splines 21 and 22, and will pump oil through the dampener orifices 27, thus dampening the effects of crankshaft speed variations.

The springs 29 will have enough tension or "weight" to prevent the members 17 from touching each other during operation. However, even a complete failure of springs and oil will not result in immediate failure of the supercharger drive, since the members 17 will drive on the annular portions 38 of their adjacent inner faces and their own inertia and spline friction will result in some damping effect.

Although a specific embodiment has been shown and described for purposes of illustration, it will be evident to those skilled in the art that the invention is capable of various modifications and adaptations within the scope and spirit of the appended claims.

The invention claimed is:

1. A torsional vibration dampener for connection between rotary driving and driven members, comprising a pair of pistons having orifices therein, a single sealed enclosure containing said pistons and containing liquid on both sides of said pistons, and means for moving said pistons toward and away from each other to pump liquid through said orifices.

2. The combination with a rotary driving member and a driven member, of a torsional vibration dampener between said members comprising a pair of pistons relatively movable axially of said driving member and containing orifices, a sealed enclosure including a cylinder for said pistons and containing liquid on both sides of said pistons, means acting on said pistons to thrust same axially on said driving member relative to one another to pump liquid through said orifices, and means for resiliently opposing such relative movement of said pistons.

3. The combination with a rotary driving member and a driven member, of a torsional vibration dampener between said members comprising a pair of pistons loosely splined on said driving member, cooperating left and right-hand helical splines on said driven member and said pistons tending upon rotation of said pistons to thrust same to and fro on said driving member, a sealed enclosure for said pistons, and means for admitting fluid to said enclosure, said pistons having orifices therein for the passage of said fluid back and forth under the thrusting action of said pistons to dampen the torsional vibrations of said driving member.

4. The combination with a rotary driving member and a driven member, of a torsional vibration dampener between said members comprising a pair of pistons loosely splined on said driving member, cooperating helical splines on said driven member and said pistons tending upon rotation of said pistons to thrust same to and fro on said driving member, means acting on said pistons to urge them apart, a sealed enclosure for said pistons, and means for admitting fluid under pressure to said enclosure, said pistons having orifices therein for the passage of said fluid back and forth under the thrusting action of said pistons to dampen the torsional vibrations of said driving member.

5. The combination with a rotary driving member and a driven member, of a torsional vibration dampener between said members comprising a pair of pistons loosely splined on said driving member, left and right-hand helical splines on the respective outer peripheries of said pistons engaging similar splines on said driven member and tending upon rotation of said pistons to thrust same to and fro on said driving member, means acting on said pistons to urge them apart, a sealed enclosure for said pistons, and means for admitting fluid under pressure to said enclosure, said pistons having orifices therein for the passage of said fluid back and forth under the thrusting action of said pistons to dampen the torsional vibrations of said driving member.

6. The combination with a rotary driving member and a driven member, of a torsional vibration dampener between said members comprising a pair of pistons having cylindrical flanges loosely splined on said driving member, left and right-hand helical splines on the respective outer peripheries of said pistons engaging similar splines on said driven member and tending when rotated to thrust said pistons to and fro on said driving member, means acting on said pistons to urge them apart, a sealed enclosure for said pistons bearing on the cylindrical flanges of said pistons, and means for admitting fluid under pressure to said enclosure, said pistons having orifices therein for the passage of said fluid back and forth under the thrusting action of said pistons to dampen the torsional vibrations of said driving member.

7. The combination with a rotary driving member and a driven member, of a torsional vibration dampener between said members comprising a pair of pistons having cylindrical flanges loosely splined on said driving member, left and right-hand helical splines on the respective outer peripheries of said pistons engaging similar splines on said driven member and tending when rotated to thrust said pistons to and fro on said driving member, springs acting on said pistons to urge them apart, a sealed enclosure for said pistons including end plates having outer ends secured to said driven member and axial hubs mounted on the cylindrical flanges of said pistons, and means for admitting fluid under pressure to said enclosure, said pistons having orifices therein for the passage of said fluid back and forth under the thrusting action of said pistons to dampen the torsional vibrations of said driving member.

8. The combination with a rotary driving member and a driven member, of a torsional vibration dampener between said members comprising a pair of dashpot pistons having cylindrical flanges loosely splined on said driving member, left and right-hand helical splines on the respective outer peripheries of said pistons engaging similar splines on said driven member and tending when rotated to thrust said pistons to and fro on said driving member, springs acting on said pistons to urge them apart, a sealed enclosure for said pistons including end plates having outer ends secured to said driven member and axial hubs mounted on the cylindrical flanges of said pistons, sealing rings between said hubs and said flanges, and means for admitting fluid under pressure to said enclosure on both sides of said pistons, said pistons having orifices therein for the passage of said fluid back and forth under the thrusting action of said pistons to dampen the torsional vibrations of said driving member.

9. The combination with a rotary driving member and a driven member, of a torsional vibration dampener between said members comprising a pair of dashpot pistons having cylindrical flanges loosely splined on said driving member, left and right-hand helical splines on the respective outer peripheries of said pistons engaging similar splines on said driven member and tending when rotated to thrust said pistons to and fro on said driving member, springs acting on said pistons to urge them apart, a housing enclosing said pistons including end plates having peripheral edges threaded to said driven member and cylindrical hubs mounted on the cylindrical flanges of said pistons, sealing rings between said hubs and said flanges, and means for admitting fluid under pressure to said housing on both sides of said pistons, said pistons having orifices therein for the passage of said fluid back and forth under the thrusting action of said pistons to dampen the torsional vibrations of said driving member.

PHILIP PUTNEY NEWCOMB.

REFERENCES CITED

The following references are of record in the file of this patent:

UNITED STATES PATENTS

| Number | Name | Date |
|---|---|---|
| 986,498 | Raders | Mar. 14, 1911 |
| 1,165,381 | Anderson | Dec. 28, 1915 |
| 2,337,134 | Thelander | Dec. 21, 1943 |

FOREIGN PATENTS

| Number | Country | Date |
|---|---|---|
| 591,913 | France | 1925 |
| 611,129 | Germany | 1935 |